M. LOUGHEAD.
BRAKING APPARATUS.
APPLICATION FILED AUG. 16, 1917.
1,288,944. Patented Dec. 24, 1918.
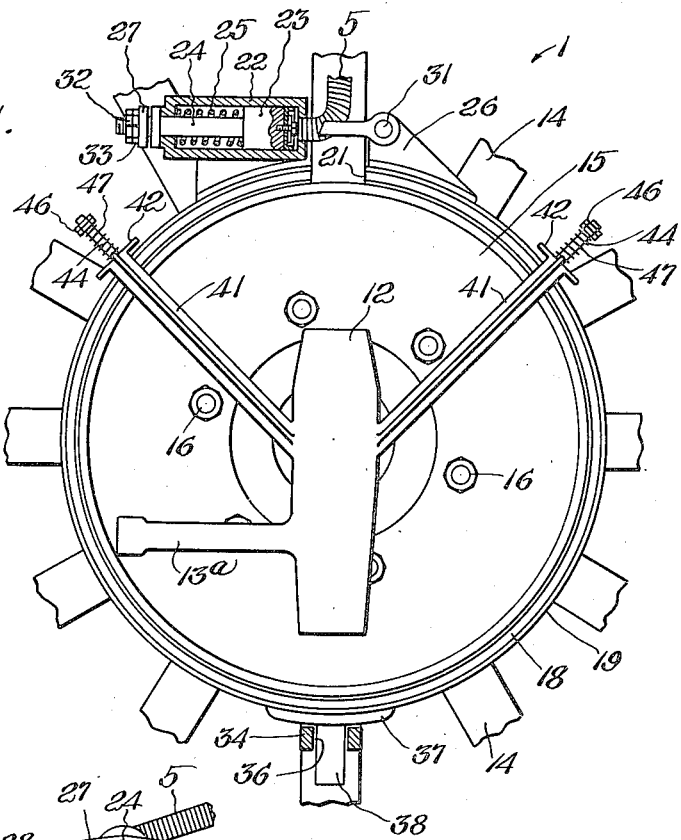
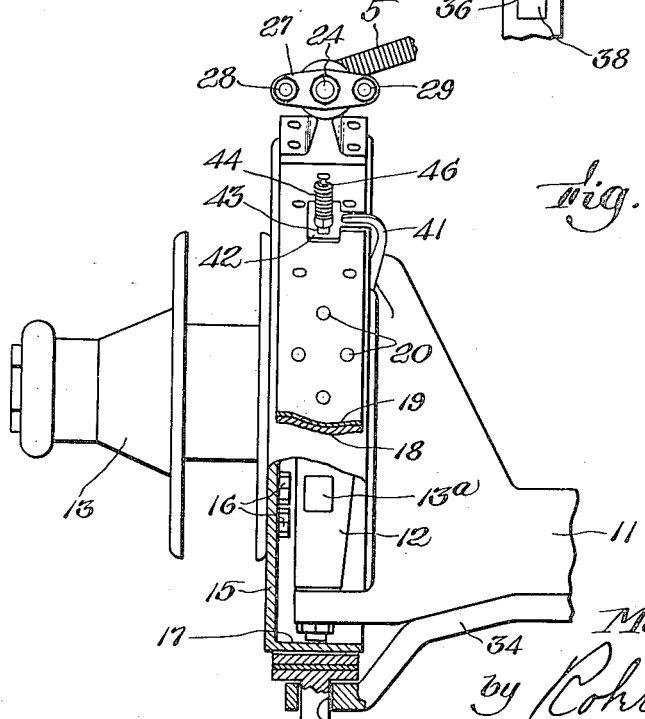
Inventor:
Malcolm Loughead,
by Roberts, Roberts & Cushman
His Attorneys.

UNITED STATES PATENT OFFICE.

MALCOLM LOUGHEAD, OF SANTA BARBARA, CALIFORNIA.

BRAKING APPARATUS.

1,288,944. Specification of Letters Patent. Patented Dec. 24, 1918.

Original application filed January 22, 1917, Serial No. 143,850. Divided and this application filed August 16, 1917. Serial No. 186,489.

*To all whom it may concern:*

Be it known that I, MALCOLM LOUGHEAD, a citizen of the United States, and resident of Santa Barbara, California, in the county of Santa Barbara and State of California, have invented new and useful Improvements in Braking Apparatus, of which the following is a specification.

This invention relates to braking apparatus for automobiles and the like and more particularly to braking apparatus for the front wheels of automobiles and the like having floating axles pivotally connected to the axle-bar or other part of the vehicle, this application being a division of my application Sr. No. 143,850, filed January 22, 1917.

In applying braking apparatus to the front wheels of automobiles and the like the portion of the brake which is attached to the wheel, herein termed the brake drum, is readily supported by being rigidly secured to the wheel; but the brake ring, which must be arranged to move into and out of contact with the drum is not so easily maintained in position, especially when it is disposed outside of the brake drum. When the brake ring is applied to the brake drum the frictional contact causes the brake ring to tend to rotate with the drum and this tendency must be restrained by substantial means. The brake ring must be movably mounted so as to be moved into and out of engagement with the brake drum, but at the same time the brake ring must be prevented from moving laterally from the brake drum.

The principal objects of the present invention are to provide means for simply and substantially maintaining the two coöperating parts of a brake in position when mounted on a floating axle, for restraining the brake ring from rotating with the brake drum when forced into engagement therewith, for positioning the brake ring laterally of the brake drum while permitting movement of the brake ring to and from the brake drum, and for generally improving braking apparatus of the character described.

In the accompanying drawings,

Figure 1 is a side elevation of one embodiment of my invention applied to a front wheel of an automobile, the wheel being detached from the axle bar and parts of the wheel being broken away, and parts of the apparatus being shown in section; and Fig. 2 is an elevational view taken at right angles to Fig. 1 with the spoke of the wheel omitted and parts being shown in section, the connection between the steering knuckle and axle bar being illustrated.

The particular embodiment of my invention herein illustrated is especially adapted to be controlled by a fluid such as compressed air or oil, but it is to be understood that the apparatus may be controlled mechanically, electrically or in any other suitable manner. When employing fluid-pressure means to control the apparatus the fluid may be supplied and regulated in any well-known or suitable manner.

The braking apparatus which is adapted to be mounted on the floating axle of a front wheel of an automobile is illustrated in detail in the figures in which 11 represents a portion of the front axle bar, 12 the steering knuckle carrying the axle arm upon which is mounted the wheel comprising a hub 13 and spokes 14. An arm 13$^a$ extending rearwardly from the steering knuckle 12 is provided for the purpose of connecting the steering knuckle with the steering gear. The steering knuckle 12 is pivotally mounted in the end of the axle bar 11 so as to rotate about a nearly vertical axis, the lower pivot of which is shown in Fig. 2.

The braking mechanism comprises a drum 15 rigidly mounted on the hub of a wheel by means of bolts 16, the drum having an annular flange 17 extending inwardly from the body portion thereof. About the flange 17 of the brake drum is arranged a brake band 18 surrounded by a forging 19, the brake band and forging being secured together by means of rivets 20. The annular brake ring 18 and forging 19 have a gap in their periphery as indicated at 21 in Fig. 1. Upon one side of this gap is mounted a cylinder 22 having a reciprocating piston 23 therein, and having an opening in its right-hand end adapted to receive the end of the conduit 5. The piston rod 24 extends outwardly through the left-hand end of the cylinder and on the inside of the cylinder is surrounded by a compression spring 25 adapted normally to maintain the piston in the position shown.

A lug 26 is mounted on the forging 19 on the right-hand side of the gap 21 and this lug is pivotally connected to the piston rod 24 by means of a yoke comprising a cross member 27 and two rods 28 and 29 extending through the cross member at the left-hand ends on opposite sides of the cylinder 22 and at the right-hand ends being pivotally connected to the lug 26 by means of a pin 31 extending through the lug. The cross member 27 is provided with a central opening fitting over the end of the piston rod 24 and is adapted to be held in position by means of nuts 32 and 33 threaded on the end of the piston rod 24, one of these nuts serving as a lock nut and the two nuts together serving to position the cross member 27 longitudinally of the piston rod.

In order to prevent the brake ring and supporting forging from rotating with respect to the brake drum as the brakes are applied, a member 34 is secured to the bottom side of the axle bar 11, the member 34 having an opening 36 in the outer end thereof. The member 34 is so positioned that the opening 36 is in alinement with the vertical axis about which the floating axle rotates with respect to the axle bar and a member 37 is suitably secured on the outside of the lower side of the forging 19, the member 37 being provided with a pin 38 fitting through the opening 36 in the member 34. The member 34 and pin 38 are made of considerable size and are rigidly mounted on the respective parts so that rotation of the brake band with respect to the brake drum is thereby prevented. Owing to the fact that the opening 36 and pin 38 are in alinement with the axis of the floating axle, the wheel is free to turn about this axis, and the means for preventing rotation of the brake ring is operative at any angular position of the wheel with respect to the axle bar.

In order to overcome any tendency for the brake ring to become displaced laterally of the brake drum, I provide one or more floating supports for laterally positioning the brake ring without interfering with the movement of the ring along the periphery of the brake drum as the brakes are applied and released. This means preferably comprises T-shaped supporting arms 41 extending laterally and upwardly from the steering knuckle 12, plates 42 being mounted on the ends of supports 41 in spaced tangential relationship to the outer surfaces of the forging 19. The plates 42 are provided with slots 43 disposed lengthwise along the periphery of the brake ring; and upon the outer surface of the forging 19 are rigidly mounted radial pins 44 of slightly smaller diameter than the widths of the slots 43. A pair of nuts 46 are threaded on the outer end of the rods 44, one of the nuts serving as a lock nut, and between these nuts and the plate 42 are disposed compression springs 47 pushing outwardly upon the nuts 46 and thereby yieldingly forcing the brake ring outwardly from the brake drum. The slots 43 are of such length that the movement of the brake ring along the periphery of the brake drum as the brakes are applied and released is permitted without interference of the rods 44 with the plates 42. Thus the brake ring is supported in a floating manner so that it is yieldingly positioned with respect to the brake drum and so that it is prevented from moving laterally with respect to the drum.

The operation of the system is as follows: When the fluid, which is preferably oil, is forced into the cylinders 22, the pistons are forced rearwardly against the action of springs 25. This motion is tranmitted through the medium of cross-bar 27 and rods 28 and 29 to the lug 26, the effect being to draw the two ends of the brake ring together, thereby causing the ring to grip and brake the drum. The yoke comprising crossbar 27 and rods 28 and 29 comprises a strong and rigid connection between the two ends of the brake ring, and owing to the disposition of the rods 28 and 29 on opposite sides of the cylinder 22, the forces are balanced and no turning moment is produced. As the brake members wear and therefore vary in size the variation can be compensated for by advancing the cross-bar farther on to the piston 24.

In the claims annexed hereto I have employed the term "annular brake member" to describe the flange 17 of the drum 15 with the understanding that this term is not limited to a hollow member but also includes a solid member, as for example, a solid drum of the axial thickness of the flange 17. I have also employed the term "a periphery" in reference to the brake member, and this I intend to include either the inner or outer periphery of a brake drum having a flange as illustrated in the drawings, it being understood that my invention is also applicable to brake mechanism in which the brake ring is disposed within instead of without the brake drum.

What I claim is:—

1. Braking apparatus for vehicles comprising a brake drum, a brake ring arranged to contact with a periphery of the brake drum, a support disposed in the axial region of the drum, an arm radially mounted on the support, the arm having a transverse portion with circumferential slot therein, a rod mounted on the brake ring so as to extend through said slot, and yielding means for positioning the rod with relation to the arm, thereby flexibly to maintain the brake ring in position with relation to the brake drum.

2. Braking apparatus for vehicles having an axle, comprising a brake drum, a brake ring arranged to contact with a periphery of the brake drum, a support disposed in the axial region of the drum, said support being rotatable with relation to the vehicle axle, a plurality of arms extending radially from the support, a member mounted on the end of each arm in juxtaposition to the brake ring, each member having a slot therein in circumferential relationship to the brake ring, members on the brake ring extending through said slots, so that lateral movement of the brake ring relatively to the brake drum is restrained while permitting circumferential movement of the brake ring relatively to the brake drum.

3. Braking apparatus for the front wheels of vehicles, having floating axles, comprising a brake drum mounted on the floating axle, a brake ring arranged to contact with a periphery of the drum, an arm extending outwardly from the knuckle of the floating axle into proximity with the brake ring, and means for yieldingly connecting the arm with the brake ring so as flexibly to maintain the brake ring in position with relation to the brake drum.

4. Braking apparatus for the front wheel of a vehicle having an axle-bar and having a floating axle pivotally mounted on the axle-bar, comprising a brake drum mounted on the floating axle substantially in the plane of the axis of the floating axle, a brake ring surrounding the drum in said plane, a bearing on the axle-bar having an opening in alinement with the axis of the floating axle and with said brake ring, and a radial pin mounted on the brake ring substantially in alinement with said axis so as to extend through said opening, whereby the brake ring is prevented from rotating with the brake drum while being permitted to turn with the floating axle.

Signed by me at Santa Barbara, California, this sixth day of August, 1917.

MALCOLM LOUGHEAD.